United States Patent
Meador

[19]

[11] 3,982,176

[45] Sept. 21, 1976

[54] COMBINATION RADIO FREQUENCY DIELECTRIC AND CONVENTIONAL INDUCTION LOGGING SYSTEM

[75] Inventor: Richard A. Meador, Houston, Tex.

[73] Assignee: Texaco Inc., New York, N.Y.

[22] Filed: Dec. 11, 1974

[21] Appl. No.: 531,562

[52] U.S. Cl. .................................................. 324/6
[51] Int. Cl.² ........................ G01V 3/10; G01V 3/18
[58] Field of Search .................................. 324/1, 6

[56] References Cited
UNITED STATES PATENTS

| | | | |
|---|---|---|---|
| 2,139,460 | 12/1938 | Potapenko | 324/6 X |
| 3,166,708 | 1/1965 | Millican | 324/1 |
| 3,180,141 | 4/1965 | Alger | 324/1 X |
| 3,259,837 | 7/1966 | Oshry | 324/6 |
| 3,329,889 | 7/1967 | Tanguy | 324/6 X |
| 3,551,797 | 12/1970 | Gouilloud et al. | 324/6 |
| 3,609,518 | 9/1971 | Baker | 324/10 X |
| 3,849,721 | 11/1974 | Calvert | 324/6 |

OTHER PUBLICATIONS

Daev, D. S., Dielectric Induction Logging, Izv. Vyssh. Ucheb. Zaved., Geol. Razved. 8, No. 11, 110–119 (1965), translation pp. 1–10.

*Primary Examiner*—Gerard R. Strecker
*Attorney, Agent, or Firm*—Thomas H. Whaley; Carl G. Ries; William J. Beard

[57] ABSTRACT

A well logging system is provided which simultaneously employs a conventional deep induction log and a radio frequency dielectric log to differentiate similar high resistivity fresh water and oil prospective zones. A 16 megahertz radio frequency dielectric induction logging system which is responsive to both conductivity and permittivity of the earth derives a signal primarily related to both of these properties. A conventional 20 kilohertz deep induction system is used to derive a signal which is primarily a function of conductivity alone. When combined in accordance with predetermined relationships according to the invention the two measurements can be used to find oil prospective zones.

13 Claims, 5 Drawing Figures

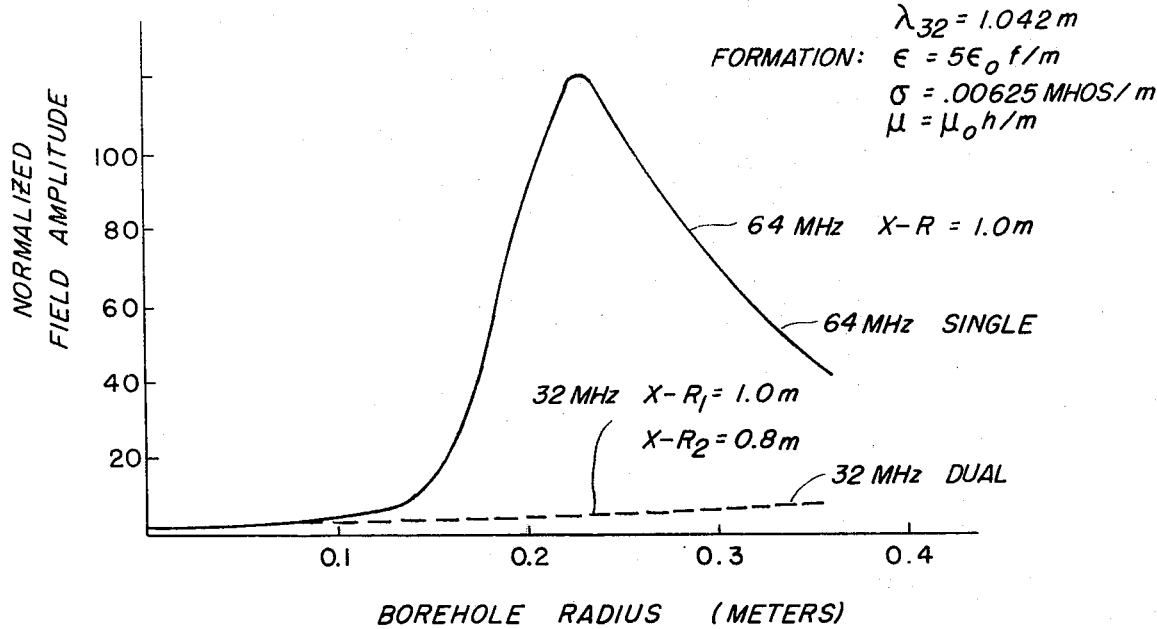
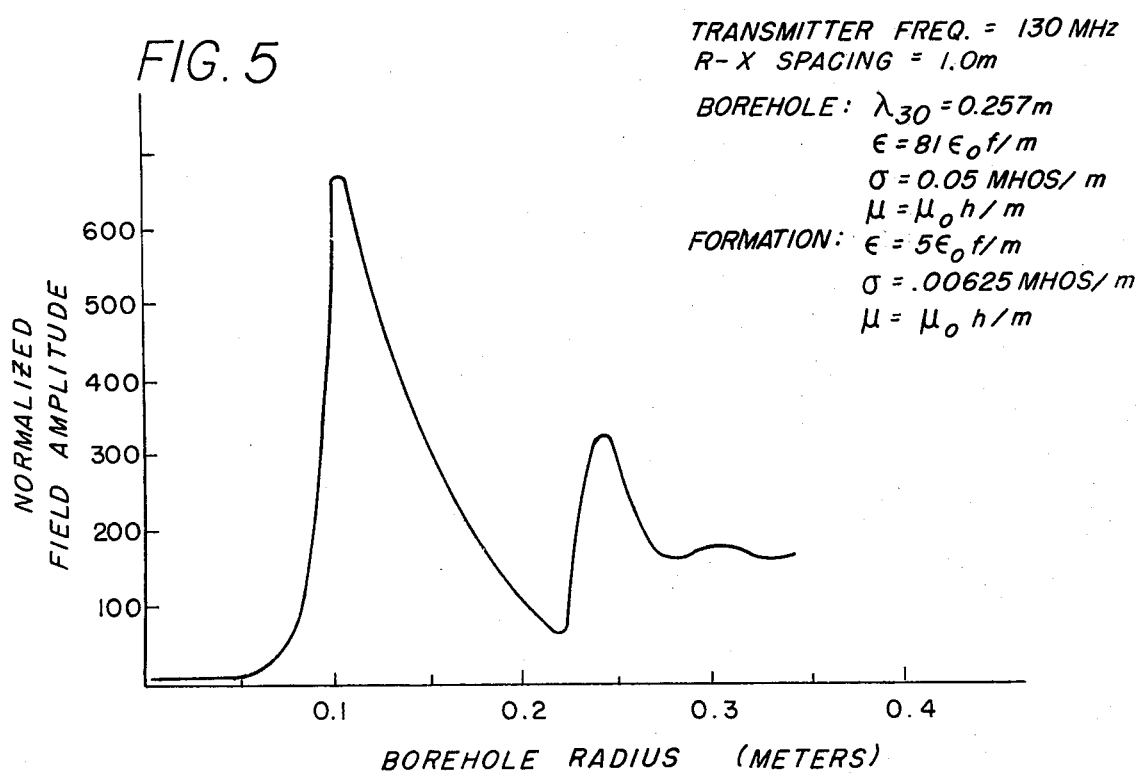

3,982,176

COMBINATION RADIO FREQUENCY DIELECTRIC AND CONVENTIONAL INDUCTION LOGGING SYSTEM

BACKGROUND OF THE INVENTION

This invention relates to methods and apparatus for determining the characteristics of materials surrounding a well bore, and more particularly, relates to methods and apparatus for combining radio frequency dielectric induction well logging measurements with conventional low frequency induction logging measurements in order to differentiate hydrocarbon from fresh water in porous earth formations.

It has become standard practice to log the electrical characteristics of earth formations in the vicinity of a well borehold in order to determine the location of oil bearing strata. This has been made possible in the past by the use of electrical resistivity logs in wells using highly conductive (low resistivity) drilling fluid and by the use of induction well logs in wells drilled with oil base drilling muds or drilling fluids having higher resistivities. In conventional resistivity logs a current emitting electrode or electrode array arranged for focusing the emitted current is used to emit either direct current or very low frequency (such as 60 hertz) alternating currents into the earth formation surrounding the well borehole by means of contacting electrodes. These currents traverse a section of the earth formations and are detected at a current return electrode situated a spaced distance from the current emitting electrode. The magnitude of the detected currents can then provide an indication of the resistivity of the earth formations surrounding the well bore. In some cases current electrodes are used in conjunction with measuring potential electrodes to determine the formation resistivity.

In electrical induction logging it has been conventional practice in the past to provide a well logging sonde having a transmitting coil (or array) disposed thereon and a receiver coil (or array) at a spaced distance therefrom. Generally, a high frequency alternating electric current is passed through the transmitter coil (normally at a frequency of approximately 20 kilohertz). The resulting electric fields produced from this high frequency alternating current in the earth formations surrounding the well bore are detected at the spaced receiver coil by sensing the induced currents or voltages in the receiver coil.

In both of these types of prior art resistivity (or conductivity) logging systems the usefulness of the system arises from the fact that earth formations having pore spaces therein filled with hydrocarbon molecules exhibit a higher resistivity than those earth formations have the pore spaces therein filled with either salt water or some conducting fluid.

Various problems have arisen in the interpretation of either conventional induction logging records or resistivity logging records of wells in areas where fresh water (relatively nonconductive such as less than 10,000 parts per million sodium chloride) are encountered. Such fresh water bearing sands or earth formations exhibit high resistivities (or low conductivities) much the same as those encountered in hydrocarbon bearing formations. In these cases it is difficult, if not impossible, to distinguish on the basis of the electric or induction well logging data alone whether an earth formation which is a prospective producing zone contains fresh water or hydrocarbon. It would therefore be very beneficial to provide a well logging system which on the basis of a single measurement of some of the physical characteristics of the earth formations in the vicinity of a well borehole could distinguish between fresh water bearing and hydrocarbon bearing earth formations.

Accordingly, it is an object of the present invention to provide a well logging system which is capable of distinguishing fresh water bearing earth formations from hydrocarbon bearing earth formations in the vicinity of a well borehole by combining conventional induction logging techniques with inductive dielectric logging techniques.

BRIEF DESCRIPTION OF THE INVENTION

The above and other objects, features, and advantages are provided by a well logging system combining a radio frequency dielectric induction logging system with a conventional deep induction logging system. In the well logging system of the present invention a downhole well logging sonde is provided which contains two different measurement apparatuses. One measurement apparatus is a radio frequency dielectric induction logging apparatus comprising a single coil 16 megahertz transmitting apparatus together with a spaced 16 megahertz receiving apparatus. The second induction logging apparatus comprises a conventional 20 kilohertz deep induction logging apparatus as known in the prior art. At the radio frequencies employed in dielectric induction logging the physical characteristics of the earth formations surrounding the well bore which influence the high frequency alternating currents induced in these formations by the radio frequency transmitting apparatuses include both the dielectric constant (or permittivity) of the earth formations together with the conductivity (or resistivity) characteristics of the earth formations in the vicinity of the borehole. At conventional induction logging frequencies, only the resistivity (or conductivity) substantially influences the measurement. By measuring the received signal at each of these two widely separated frequencies and by combining these measurements according to the concepts of the invention prospective oil zones may be differentiated from fresh water zones where interpretation may have been difficult using solely the techniques of the prior art induction and resistivity logging.

The novel concepts of the present invention are pointed out with particularity in the appended claims. The invention is best understood by reference to the following detailed description thereof when taken in conjunction with the accompanying drawings in which:

BRIEF DESCRIPTION OF THE DRAWINGS

FIG. 4 is a theoretically derived graph illustrating the amplitude variation of a 64 megahertz single source radio frequency induction dielectric sonde for borehole diameters from 0 to .35 meters.

FIG. 5 is a theoretically derived graph illustrating the amplitude variation of a 130 megahertz single source radio frequency induction dielectric sonde for borehole diameters from 0.0 to 0.4 meters.

DETAILED DESCRIPTION OF THE INVENTION

Figure 1:
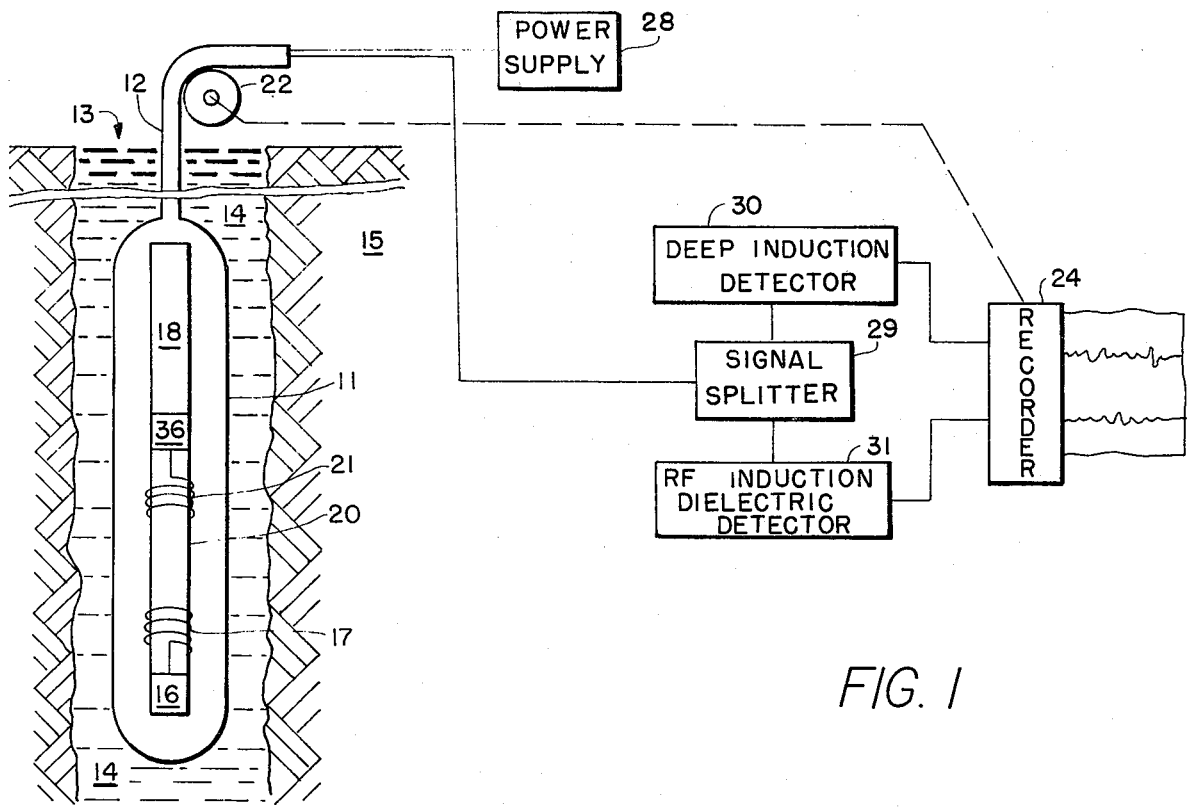
FIG. 1 is a block diagram illustrating the overall layout of a combination conventional induction and radio frequency induction dielectric logging system in accordance with the present invention.

Induction and electrical resistivity logs have proven useful in the past in determining earth formation resistivity and thereby locating oil bearing sands in the vicinity of a well borehole. However, due to the fact that fresh water sands and oil sands have similar high resistivities these logs standing alone (conventional induction and resistivity) cannot adequately detect the difference between oil and fresh water filling the pore spaces of the earth formations in the vicinity of the borehole. At radio frequencies, however, the possibility of measuring the effect of formation permittivity (or dielectric constant) can provide a means for distinguishing these types of liquid bearing strata. Hydrocarbons have a characteristically low dielectric constant $\epsilon_r$, less than 5. On the other hand fresh water has a relatively high dielectric constant $\epsilon_r$, approximately equal to 80. The permittivity of a material $\epsilon$, is defined as the natural electrical polarization of this material. In this description the terms relative permittivity and dielectric constant $\epsilon_r$ will be used synonymously. These quantitites are related to the permittivity of free space $\epsilon_0$ by the relationship given in Equation 1:

$$\epsilon = \epsilon_r \epsilon_0 \qquad (1)$$

where $\epsilon_0 = 8.854$ picofarads per meter, the permittivity of free space.

From electromagnetic field theory, and in particular from the theory of a point source oscillating magnetic dipole, the behavior of radio frequency fields in the vicnity of a cylindrical borehole may be expressed as in Equation 2 (the Helmholtz Equation in conventional cylindrical coordinates $\rho$, $\phi$, and $z$)

$$\left[\frac{1}{\rho}\frac{\delta}{\delta\rho}(\rho\frac{\delta}{\delta\rho}) + \frac{1}{\rho^2}\frac{\delta^2}{\delta\phi^2} + \frac{\delta^2}{\delta z^2} + K^2\right]\pi_z^{(m)} = \frac{j}{\omega\mu}I^{(m)}\frac{\delta(\rho)\delta(z)}{\rho} \qquad (2)$$

where
$\pi_z^{(m)}$ is the hertz magnetic vector;
$I_{(m)}$ the magnitude of the current; and
$j = \sqrt{-1}$.
K is the complex wave number given by Equation 3:

$$K^2 = \omega^2\mu\epsilon + j\omega\mu\sigma \qquad (3)$$

In Equation 2 $\delta(\rho)$ and $\delta_{(z)}$ are unit impulse functions of the dirac type.
$\omega = 2\pi f$ where $f$ is the frequency of oscillation of the point magnetic dipole.
$\epsilon$ is the electric permittivity of the media.
$\mu$ is the magnetic permittivity of the material surrounding the magnetic dipole and $\sigma$ is the electrical conductivity of the medium.

It will be observed that there are three physical constants associated with the material surrounding the oscillating point magnetic dipole in the above equations. These are the relative magnetic permeability $\mu$, the electrical permittivity $\epsilon$, and the electrical conductivity $\sigma$. For most earth formations at the frequencies of interest (10 to 60 megahertz) with respect to the present invention the relative magnetic permeability $\mu$ may be taken as a constant. Variations in $\mu$ in the earth materials of interest generally fall in the range of 0.001 to 0.1 percent. Thus, only the two media constants contributing a significant variation from one earth material to another at the frequencies of interest are $\epsilon$ and $\sigma$. These two physical characteristics have a direct effect on any very high frequency alternating electrical current flowing in the media. Both of these physical properties of the media have an effect on the magnitude and the phase with respect to the transmitter of these induced or eddy currents in formations in the vicinity of a well borehole.

Assuming a point magnetic source placed in a cylindrical borehole and responding to the Helmholtz Equation, the total field is defined as the field of the source which is sensed by a receiver coil in any medium. The total field may be separated into a primary field and a secondary field. The primary field is defined to be the field of the source which is sensed by the receiver coil in some reference medium (such as vacuum or air). The secondary field is defined as the field which when added vectorially to the primary field, results in the total field. The primary field has an amplitude and a phase which are equal to the amplitude and phase of the total field in the reference medium. When the source is placed in a medium which is different from the reference medium, the secondary field adds vectorially to the new primary field to produce the total field within the new medium. The primary field serves as an amplitude and phase reference for the determination of the secondary field.

The currents that flow in the medium surrounding the oscillating point magnetic dipole are called eddy currents. The eddy currents generate secondary fields, which in the case of a highly conductive medium, act to oppose the primary or reference field. However, when $w \epsilon$ (the angular operating frequency multiplied by the electrical permittivity) approaches the magnitude of $\sigma$ (the electrical conductivity) the eddy currents are phase shifted and may actually result in secondary fields which increase the magnitude of the total field. This is commonly the case when operating at the frequencies of interest in the present invention which generally may be stated to comprise radio frequencies from 10 to 60 megahertz.

Since changes in both $\epsilon$ and $\sigma$ effect changes in the eddy currents at any given radio frequency, the measurement of a single amplitude cannot separate the two effects. However, in accordance with the principles of the present invention, the measurement of the amplitude of the total field at a radio frequency combined with the measurement of the formation resistivity by use of a conventional deep induction log may be combined to derive quantities relates to $\epsilon$ and $\sigma$ simultaneously. Other techniques may also be used for this purpose but will not be discussed here.

The Helmholtz Equation (Equation 2) is valid in any cylindrical layer of a layered medium surrounding the point magnetic dipole in the borehole. By use of a computer program to perform numerical integration of the solutions of Equation 2 in various cylindrical layers about such a point magnetic dipole and by applying boundary conditions at the interface of these regions and at the source, the total field at a receiver coil displaced a distance z, along the borehole axis from the point magnetic dipole may be derived.

Through studies of the numerical solution of the Helmholtz equation, (Equation 2) in boreholes of various diameters, graphical representation of the amplitude of the field at a receiver coil as a function of the borehole diameter for various different size boreholes may be made. Such a graphical representation is shown in FIG. 4 for a 64 megahertz single coil transmitter and receiver system and for a 32 megahertz dual coil transmitter and single coil receiver system. It can be observed in FIG. 4 that at a frequency of 64 megahertz what appears to be an anomalous resonance effect occurs at a borehole radius of about 10 inches. It can also be observed that the 32 megahertz dual transmitter coil amplitude response does not exhibit this type of resonance effect for reasonably sized boreholes.

Referring now to FIG. 5, a graphical representation illustrating the normalized total field amplitude at a receiver coil on the z axis of the borehole as a function of the borehole radius for an operating frequency of 130 megahertz is illustrated. In this case the resonance effect is exhibited at a borehole radius of about 0.1 meters (4 inches) and again at a borehole radius of 0.25 meters (about 10 inches). Thus, if it were attempted to measure the dielectric and conductivity properties of the material surrounding the well bore at frequencies as high as 64 megahertz, it is apparent from the graphical representations of FIGS. 4 and 5 that some correction would possibly be needed for these resonance effects. On the other hand, it will be remembered that in order to determine both the electrical conductivity and the permittivity (or dielectric constant) of the materials surrounding the well bore at least two independent measurements must be made in order to interpret the measurements in terms of both the dielectric constant $\epsilon$ and the conductivity $\sigma$ of the earth formation surrounding the borehole.

In order to avoid resonance effects such as those depicted in FIGS. 4 and 5, in the present invention amplitude measurements of the total field signals at a receiver coil situated in the borehole are made at frequencies of from 10 to 60 megahertz. Theoretical calculations indicate that measurements made at such frequencies should be more accurate than those obtained at higher frequencies because of this borehole resonance effect. In a particular embodiment of the invention measurements are made at a frequency of 16 megahertz and at a conventional induction logging frequency of approximately 20 kilohertz.

Referring now to FIG. 1, a combination radio frequency induction dielectric and conventional induction well logging system in accordance with the concepts of the present invention is illustrated schematically. A well logging sonde 11 whose main body member is preferably constructed of fiber glass or some other nonconducting material of sufficient strength characteristics, is shown suspended by a well logging cable 12 in an uncased well borehole 13. The borehole 13 is filled with a borehole fluid 14 and is surrounded by earth formations 15 whose properties are to be measured.

The upper portion of the sonde 11 is seen to be basically comprised of a conventional deep induction logging apparatus 18 which operates at a frequency of approximately 20 kilohertz. The principles of conventional induction logging to measure formation resistivity (or conductivity) are well known in the art and will not be discussed in detail here. For further details of this type of logging, reference may be had to "Schlumberger Log Interpretation", Vol. I Principles, 1972 Edition, published by Schlumberger Limited, 277 Park Avenue, New York, N.Y. It will suffice to say herein for the purposes of this description that the deep induction log resistivity measurement apparatus 18 produces an output signal representative of the resistivity of the earth formations 15 in the vicinity of the borehole 13 which may be appropriately multiplexed (as by intermediate frequency multiplexing techniques such as those shown in copending application Ser. No. 517,704, filed Oct. 24, 1974, assigned to the assignee of the present invention) with the radio frequency dielectric induction measurement to be discussed subsequently, for transmission to the earth's surface via conductors of well logging cable 12.

The lower portion of the well logging sonde 11 is seen to be basically comprised of a radio frequency transmitter electronics section 16 and associated transmitting coil 17 which is wound about a central strength member or mandrel 20. This mandrel 20 is also preferably comprised of a nonconducting material. The transmitter coil 17 is operated at a frequency of 16 megahertz. A receiver coil 21 is spaced axially along the axis of the sonde 11 from the transmitter coil 17 and is situated approximately one meter from the center of 16 megahertz transmission coil 17. It will be appreciated by those skilled in the art that while this transmitter to receiver coil spacing has been found useful in practicing concepts of the present invention, that it is intended as being illustrative only. It may be entirely practical to utilize other than the disclosed spacing distance between the transmitting and receiving coils and other coil spacings are considered to be within the scope of the invention. Other radio frequencies within the range of 10 to 60 megahertz are also considered to be within the scope of the invention for this purpose.

The radial depth of investigation of the induction dielectric logging system of the present invention is influenced by the spacing distance between the transmitting and receiving coils. In general the longer the spacing between the transmitter and receiver coil, the deeper the radial depth of investigation into the earth formations in the vicinity of the borehole. However, it will be appreciated that it is necessary to space the transmitter and receiver coils close enough together to assure reception of a usable signal level from earth formations having various conductivity and dielectric properties. As a highly conductive material adjacent to the borehole will attenuate signals at the radio frequency used in practicing the present invention substantially, then it would be required to utilize a higher transmitting power as the distance between the transmitter and receiver coils is increased.

A conventional winch arrangement (not shown) at the surface is used for moving the sonde 11 through the borehole during the well logging operation. A sheave wheel 22 over which cable 12 passes may be electrically or mechanically linked to a data recorder 24 which is used to record signals from the downhole sonde 11 as a function of its depth in the borehole 13. Power for operation of the downhole electronics 36 is provided on conductors of the well logging cable 12 by a surface power source 28.

Still referring to FIG. 1 it may be seen that signals from the sonde 11 are supplied via cable 12 conductors to a signal splitter circuit 29. These input data may be thought of as two separate signals at two different intermediate frequencies $f_1$ and $f_2$ on the cable 12 conductor. Signal splitter 29 separates these two signals and supplies the radio frequency dielectric portion to RF dielectric induction detector 31. The conventional deep induction signal is supplied to deep induction detector 30. Detectors 30 and 31 detect the amplitude of these two signals and supply output signals representative thereof to the recorder 24 which records them as a function of the borehole depth of the sonde 11. These signals may be interpreted to provide indications of oil zones as will be described subsequently.

Figure 2:
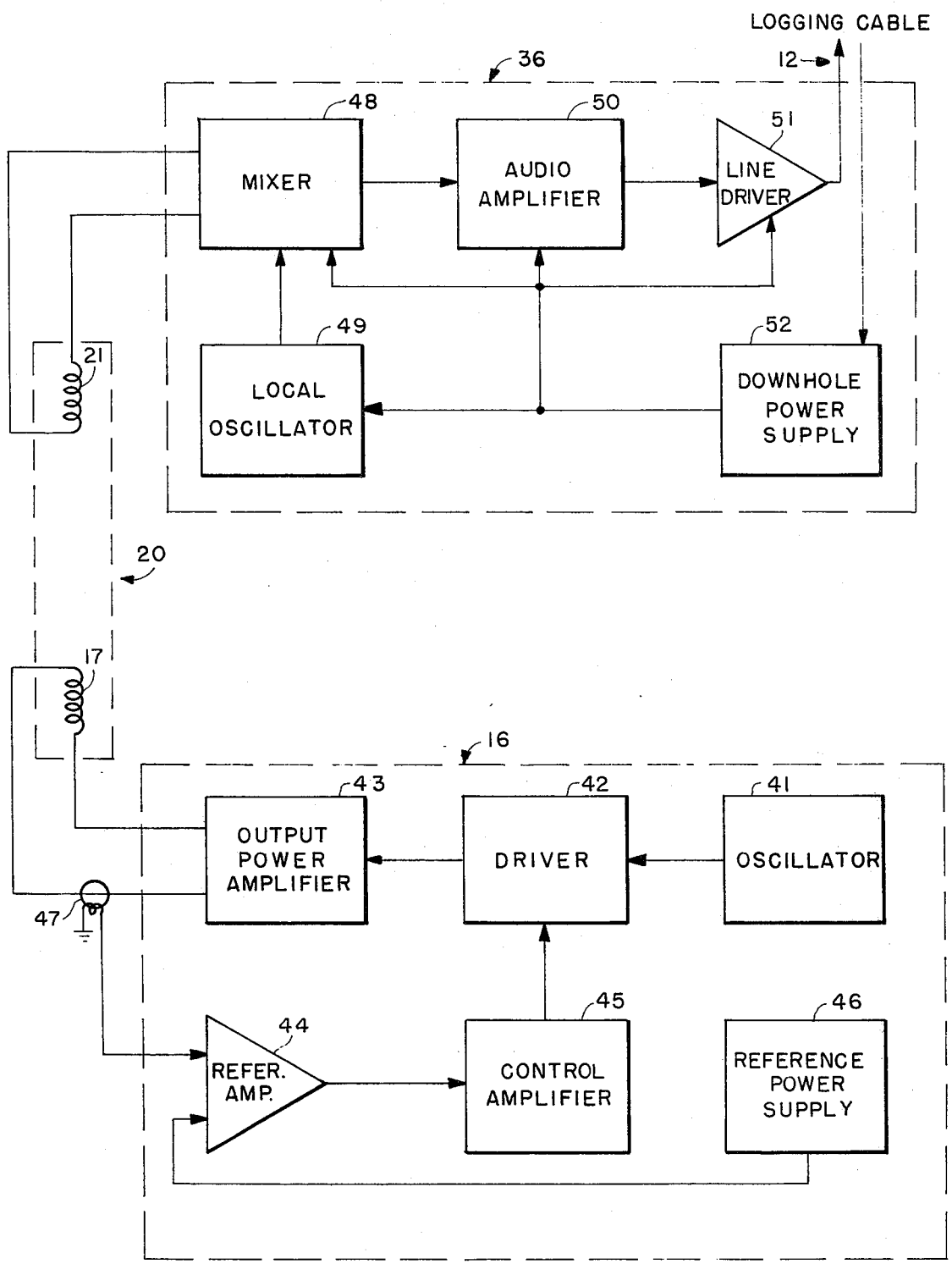
FIG. 2 is a schematic block diagram illustrating the downhole transmitting and receiving apparatus of the radio frequency induction dielectric portion of the logging system of the invention.

Referring now to FIG. 2 the RF dielectric log portion of the system is shown in more detail in block diagram form. The transmitter portion thereof comprises a 16 megahertz crystal controlled oscillator 41. The 16 megahertz output of the oscillator 41 is supplied to a gain controlled driven amplifier 42 which amplifies this signal to an appropriate level for input to an output power amplifier stage 43. Power amplifier 43 supplies a constant current 16 megahertz signal to transmitter coil 17. A portion of the output of amplifier 43 is sampled by a toroidal pickup coil 47 located in the tuned output stage of amplifier 43. This signal is compared with a reference signal supplied by a reference power supply 46 in a reference operational amplifier 44. The output of reference amplifier 44 is supplied to a control amplifier 45 where it is linearly amplified to a level sufficient to control the gain of driver stage 42. Thus by monitoring the output of power amplifier 43 the RF electromagnetic flux in the transmitter coil 17 is kept at a constant level by comparison with the reference signal supplied by reference power supply 46.

The 16 megahertz receiver coil 21 is coupled to a mixer stage 48 which is also supplied with a constant frequency input signal from a local oscillator 49. The mixing action of mixer stage 48 provides an output signal at one of the intermediate frequencies $f_1$ or $f_2$ used for transmitting the data to the surface on cable 12. This intermediate frequency signal is amplified linearly in audio frequency amplifier stage 50 and finally amplified to a power level sufficient for transmission to the surface in line driver amplifier 51. The receiver circuitry is supplied with power by a conventional design downhole power supply 52 which converts the power supplied by surface power supply 28 to the proper voltage levels for this purpose. The transmitter circuitry is operated by a battery power supply (not shown) located in the lower portion of the sonde 11.

The armored cable contemplated for use in the present invention comprises a triaxial well logging cable consisting (from the outside - in) of an outer armor shield, an insulating layer, a coaxial cable shielding layer, a second insulating layer and a center conductor. While the logging system of the invention is preferably operated from this type of well logging cable, it will be appreciated by those skilled in the art that other types of multiconductor armored well logging cable as known in the art could be used if desired.

Figure 3:
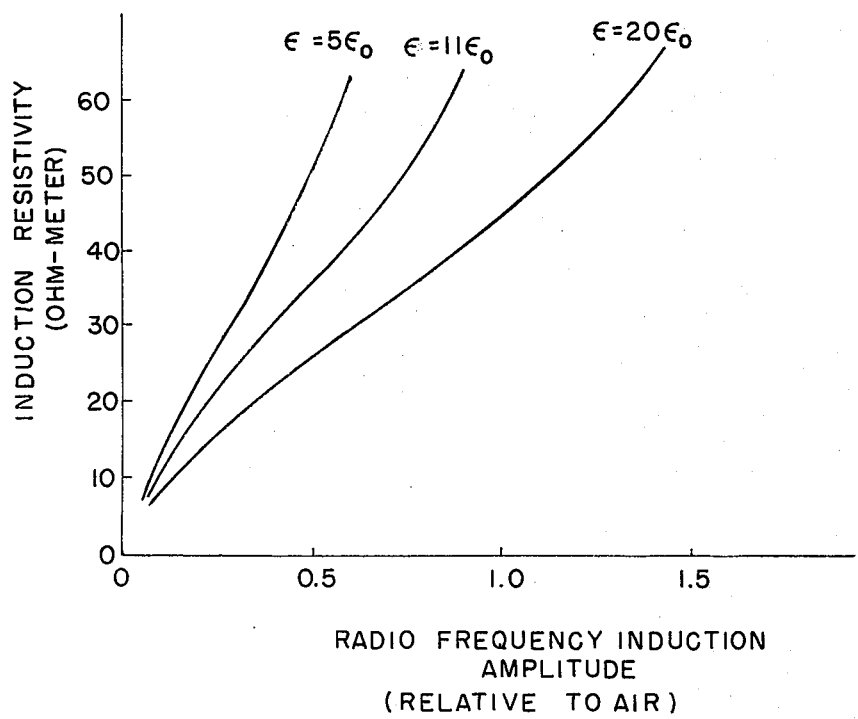
FIG. 3 is a graphical relationship showing the relationship between the conventional deep induction log response and the radio frequency dielectric log response of the system of the invention.

Referring now to FIG. 3, a graph of the response of a well logging system such as that described when embedded in a homogeneous medium is shown in graphical form. The conventional induction log resistivity is plotted on the ordinate while the abscissa contains a plot of the normalized field amplitude of the 16 megahertz received signal. By normalized it is meant here that the received signals are normalized to their corresponding value in air. That is to say, the signal received at 16 megahertz at the receiver coil in the formation is divided by the amplitude of the 16 megahertz signal received at the receiver coil in air.

The multiple curves of FIG. 3, it should be observed, are a function of both the conductivity and dielectric properties of the homogeneous medium in which the well logging sonde is considered to be embedded for the purposes of the graphical representation of FIG. 3. It will be observed from FIG. 3 that the amplitude of the 16 megahertz signal has considerably more dependence on the permittivity of the earth formation material than the conventional induction log signal.

It will be appreciated from a study of FIG. 3 that oil prospective zones will be differentiated from fresh water zones having similar high resistivities on the plot by falling to the left in the shaded zone labelled "probable hydrocarbon". This effect is due to the dependence of the 16 megahertz RF signal amplitude on the dielectric properties of the earth formations. Curves such as that of FIG. 3 may be accurately calibrated for the system in formations having known resisitivity and dielectric properties and this means used to derive quantitative values for the prospective oil content of unknown formations being logged in the field.

The above description may make other alternative embodiments of the invention apparent to those skilled in the art. It is therefore the aim of the appended claims to cover all such changes and modifications as fall within the true spirit and scope of the invention.

The embodiments of the invention in which an exclusive property or privilege is claimed are defined as follows:

1. A method for determining the characteristics of earth formations in the vicinity of a well borehole, comprising the steps of:
   generating in a well borehole a radio frequency electromagnetic field in the frequency range of 10 megahertz to 60 megahertz;
   detecting at a spaced distance from the location of generation of said radio frequency electromagnetic field the total field amplitude of said radio frequency field, said amplitude being a function of the conductivity and permittivity of the earth formations in the vicinity of the borehole and generating a signal representative thereof;
   normalizing said total field signal with respect to air;
   simultaneously with said generating and detecting steps, generating a conventional induction log measurement of the conductivity of the earth formations in the vicinity of the borehole; and
   combining said induction log conductivity measurement and said normalized radio frequency total field signal according to a predetermined functional relationship to derive indications of oil prospective zones penetrated by the borehole.

2. The method of claim 1 wherein all of said steps are repetitively performed at a plurality of depths in the borehole and said induction log conductivity measurement and said radio frequency normalized total field amplitude signal are recorded as a function of borehole depth.

3. The method of claim 2 wherein said radio frequency electromagnetic field is generated at a frequency in the range of 15 megahertz to 35 megahertz.

4. The method of claim 2 wherein said radio frequency electromagnetic field is generated at a frequency of 16 megahertz.

5. The method of claim 1 wherein said conventional induction log conductivity measurement is performed at a frequency less than 50 kilohertz.

6. The method of claim 1 wherein said conventional induction log conductivity measurement is performed at a frequency of approximately 20 kilohertz.

7. The method of claim 1 wherein said radio frequency field is generated at a frequency of approximately 16 megahertz and said conventional induction log conductivity measurement is performed at a frequency of approximately 20 kilohertz.

8. A method of locating oil prospective zones in earth formations penetrated by a well borehole, comprising the steps of:

generating in a well borehole a radio frequency electromagnetic field in the frequency range from 10 to 60 megahertz;

simultaneously generating in a well borehole a low frequency time varying electromagnetic field in the frequency range below 50 kilohertz;

detecting at a first spaced distance from the location where said radio frequency electromagnetic field is generated, the total field amplitude of said radio frequency electromagnetic field, normalizing said amplitude signal with respect to air and generating a first detection signal representative thereof;

detecting at a second spaced distance from the location where said low frequency electromagnetic field is generated, the amplitude of said low frequency electromagnetic field and generating a second detection signal representative thereof;

simultaneously transmitting said first and second detection signals from the borehole to the surface of the earth and combining said first and second detection signals according to a predetermined functional relationship to derive indications of oil perspective zones penetrated by the borehole.

9. The method of claim 8 wherein all of said steps are repetitively performed at a plurality of depths in the borehole and said first and second detection signals are recorded as a function of borehole depth.

10. The method of claim 8 wherein said step of simultaneously transmitting said first and second detection signals is performed by connecting said detection signals to two different intermediate frequency signals for transmission to the surface of the earth.

11. The method of claim 8 wherein a radio frequency electromagnetic field in the frequency range of 15 to 35 megahertz is used.

12. The method of claim 8 wherein a radio frequency electromagnetic field at a frequency of 16 megahertz is used.

13. The method of claim 8 wherein a radio frequency electromagnetic field at a frequency of approximately 16 megahertz is used and a low frequency electromagnetic field at a frequency of approximately 20 kilohertz is used.

* * * * *